Jan. 17, 1967  B. B. OHNSTAD  3,298,697
GASKET FOR CONCRETE CONDUITS
Filed Aug. 5, 1963
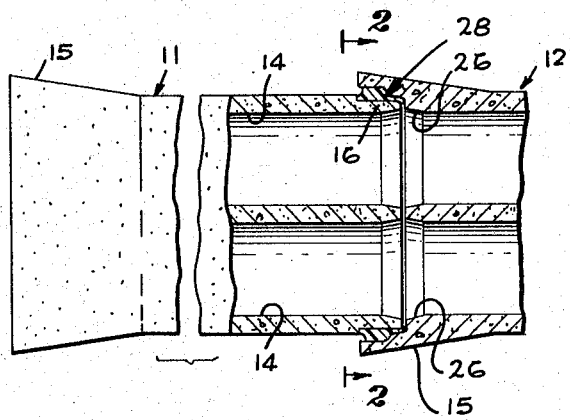
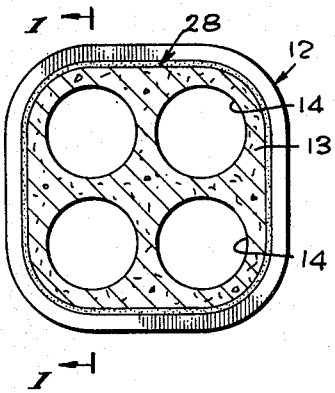
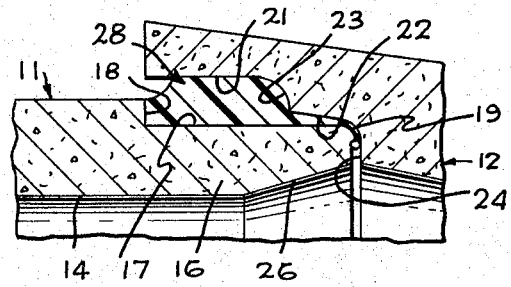
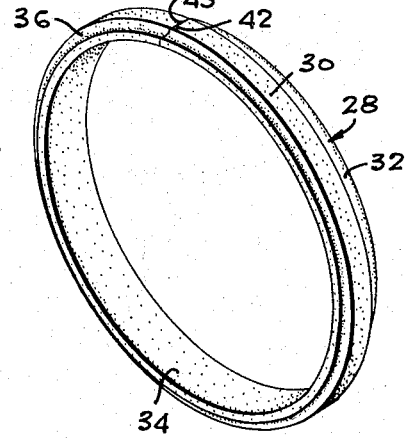
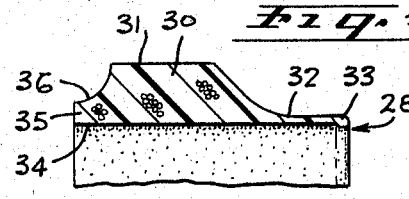
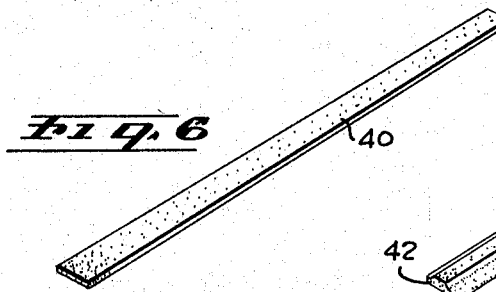
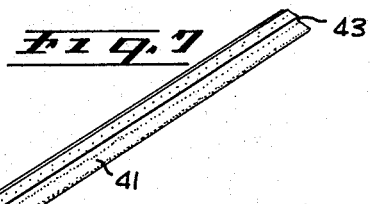
BURL B. OHNSTAD
INVENTOR.
BY Mason & Graham
ATTORNEYS

United States Patent Office 3,298,697
Patented Jan. 17, 1967

3,298,697
GASKET FOR CONCRETE CONDUITS
Burl B. Ohnstad, South Gate, Calif., assignor to American Pipe and Construction Co., Monterey Park, Calif., a corporation of California
Filed Aug. 5, 1963, Ser. No. 299,755
4 Claims. (Cl. 277—11)

This invention has to do generally with gaskets used in joining concrete pipe sections and particularly to an improved gasket of a plastics material designed for use in joints of telephone conduits to provide a positive seal and prevent infiltration of liquid at the joint.

An object of the invention is to provide an improved gasket designed specifically for telephone conduit but useful for other purposes which of itself serves to provide a liquid-tight seal between sections of pipe so that nothing else is required in making up the joint.

Another object is to provide a compressible gasket which, when installed in the annular space between the bell end of one conduit section and the spigot end of the other conduit section, compresses and readily flows into concrete surface imperfections, thus insuring a watertight seal.

A further object is to provide a yieldable joint which conforms to relative movement between adjoining conduit sections.

A further object is to provide a gasket which is inert to most solvents and chemicals and is unaffected by lubricants and by any chemical likely to be encountered in the soil.

A further object is to provide a gasket which minimizes the force required to close the joint between sections of conduit and thereby eliminates the need for special assembly equipment.

Another object is to provide a relatively inexpensive, easily fabricated joint which is designed to be applied to the spigot end of a section of conduit manually.

These and other objects will be apparent from the drawing and the following description. Referring to the drawing:

FIG. 1 is a fragmentary longitudinal sectional view through the joint between two concrete telephone conduit sections on line 1—1 of FIG. 2;

FIG. 2 is a cross section on line 2—2 of FIG. 1;

FIG. 3 is a fragmentary cross section of a portion of the view of FIG. 1, but on a larger scale;

FIG. 4 is a fragmentary sectional view of a portion of the gasket on the same scale as FIG. 3;

FIG. 5 is an isometric view of the gasket;

FIG. 6 is an isometric view of a strip of material for use in making the gasket, and FIG. 7 is a view of the strip of FIG. 6 after it has been molded.

More particularly describing the invention, numerals 11 and 12 generally designate telephone conduit sections respectively which have a body 13 of concrete formed or molded to define several passages or ducts 14 of which four are shown in the example illustrated although such conduits also commonly have six ducts. Each conduit section is provided with a bell or enlarged end 15 at one end and with a spigot end 16 at the other, the spigot end being characterized by having a peripheral end surface 17 of reduced diameter beyond a shoulder 18. The spigot end is preferably slightly beveled at 19 at its extreme end.

The bell end is formed internally to provide an outermost cylindrical internal surface 21 of relatively large diameter, and, inwardly of this, an inner tapered or frusto-conical internal surface 22 of less diameter. A curved surface 23 separates the two surfaces 21 and 22. A shoulder 24 is provided inwardly of the surface 22. Each of the conduits 14 has flared outer ends 26.

The gasket of the invention, designated generally by numeral 28, comprises an annular body of a closed cell, foam-type plastics, preferably polyethylene. The body is shaped to provide a relatively thick, spongy main section 30 which has an outer surface 31 which is normally cylindrical. The body has a thin, relatively dense flange or lip 32 which terminates at its end in a bead 33. The internal surface of the gasket, designated 34, is also normally cylindrical. The end of the gasket opposite the portion at 32 is reduced in diameter to form a section 35 which is defined by the inner surface 34 and by a concavely arcuate in cross section surface 36.

In assembling the joint, the gasket, which is made slightly smaller in circumference than the distance around the surface 17 of the spigot, is stretched onto the surface 17 with the bead 33 projecting over and beyond the end of the spigot. In assembling the pipe, any suitable lubricant can be applied to the gasket to facilitate the gasket entering the bell end of the conduit section. As the joint is made up, the portion or body 30 of the gasket is compressed somewhat between the surface 17 of the spigot and the surfaces 21 and 22 of the bell. Also, the portion 32 of the gasket diameter fits snugly and slightly compressed within the portion of the bell having the surface 22.

While the gasket may be fabricated in various ways, a simple process for doing this comprises providing an elongated strip 40 of the material to be used which is cut to a length equal to the circumference of the desired gasket to be formed. The strip has a width equal to that required of the gasket to be formed. This strip 40 is molded by the application of heat and pressure in suitable dies to form a molded strip 41 having the desired shape in cross section. The strip 41 is then made into a gasket by joining the ends 42 and 43 by the application of heat and pressure.

Although I have shown and described preferred forms of my invention, I contemplate that various changes and modifications can be made therein without departing from the invention, the scope of which is indicated by the following claims.

I claim:
1. A gasket for use in providing a liquid-tight joint between the bell and spigot ends of adjoining concrete conduit sections, comprising an annular body of a plastics characterized by a closed-cell foam-type structure, said body having a substantially straight inner surface parallel to its axis, having a main portion of relatively thick cross-section with a substantially straight outer surface parallel to its axis, said body having a relatively long end section at one end of said main portion terminating in a bead, said body having a short end section at its other end of a thickness intermediate that of the relatively long end section and the main section.

2. The gasket set forth in claim 1 in which the main portion of the body is readily compressible and sponge-like in character, and in which the relatively long end section is relatively dense in character and relatively less compressible.

3. The gasket set forth in claim 1 in which said gasket is made of polyethylene.

4. A gasket for use in providing a liquid-tight joint between the bell and spigot ends of adjoining concrete conduit sections, comprising an annular body of a plastic characterized by a closed-cell foam type structure, said body normally having a cylindrical inner surface, having a main portion of relatively thick cross-section, and a lip at one end thereof of thin cross-section, said main portion and said lip normally each having a cylindrical peripheral surface and said body having a frusto-conical peripheral surface therebetween, said main portion being sponge-like in character and readily compressible and said lip being relatively dense and relatively less compressible.

References Cited by the Examiner

UNITED STATES PATENTS

| | | | |
|---|---|---|---|
| 619,784 | 2/1899 | Perry | 277—222 |
| 2,116,705 | 5/1938 | Marx et al. | 277—207 |
| 2,270,519 | 1/1942 | Fisher. | |
| 2,720,329 | 10/1955 | Kuchner | 220—46 |
| 2,966,539 | 12/1860 | Sears et al. | 277—207 |
| 3,073,609 | 1/1963 | Hamilton. | |

FOREIGN PATENTS

| | | |
|---|---|---|
| 454,900 | 10/1936 | Great Britain. |
| 481,331 | 3/1938 | Great Britain. |
| 803,997 | 11/1958 | Great Britain. |

LAVERNE D. GEIGER, *Primary Examiner.*

EDWARD V. BENHAM, *Examiner.*

J. MEDNICK, *Assistant Examiner.*